United States Patent [19]

Kimura et al.

[11] Patent Number: 4,705,366
[45] Date of Patent: Nov. 10, 1987

[54] HIGH TEMPERATURE MICROSCOPE

[75] Inventors: Hiroshi Kimura, 10-10, Yagiyama-kasumicho; Kenji Abiko, 102, 2-31, Nagamachi 8-chome, both of Sendai-shi, Miyagi 982, Japan

[73] Assignees: Hiroshi Kimura; Kenji Abiko, both of Sendai; Nihon Shinku Gijutsu Kabushiki Kaisha, Chigasaki; Olympus Optical Company Limited, Tokyo, all of Japan

[21] Appl. No.: 867,478

[22] Filed: May 27, 1986

Related U.S. Application Data

[62] Division of Ser. No. 698,828, Feb. 6, 1985, Pat. No. 4,643,531.

[30] Foreign Application Priority Data

May 24, 1985 [JP] Japan ............................ 60-110190

[51] Int. Cl.$^4$ .................... B02B 21/24; B02B 5/00; B02B 7/00
[52] U.S. Cl. .................................. 350/529; 350/247; 350/319
[58] Field of Search ............... 350/247, 319, 529, 583; 116/276; 73/330, 334; 137/559; 221/155; 222/156

[56] References Cited

U.S. PATENT DOCUMENTS

| | | | |
|---|---|---|---|
| 2,071,061 | 2/1937 | Coursen | 350/247 |
| 2,713,725 | 1/1973 | Uesugi | 350/247 |
| 3,799,657 | 3/1974 | Dager et al. | 350/247 |
| 4,121,175 | 10/1978 | Hamil et al. | 350/319 |
| 4,388,375 | 6/1983 | Hopper et al. | 350/339 R X |
| 4,409,268 | 10/1983 | Inoue et al. | 350/339 R X |
| 4,501,471 | 2/1985 | Culley et al. | 350/334 |
| 4,505,546 | 3/1985 | Umeda et al. | 350/339 R X |
| 4,533,214 | 8/1985 | Penz et al. | 350/334 |
| 4,586,790 | 5/1986 | Umeda et al. | 350/339 R X |

FOREIGN PATENT DOCUMENTS 57-140939  8/1982  Japan.

OTHER PUBLICATIONS

Grain Boundary Structure and Related Phenomena—Proceedings of Fourth Japan Institute of Metals—vol. 26, 1986, pp. 1-8—Kenji Abiko.

Primary Examiner—William H. Punter
Attorney, Agent, or Firm—Balogh, Osann, Kramer, Dvorak, Genova & Traub

[57] ABSTRACT

A high temperature microscope having an optical system and a chamber system is disclosed. Frictional rotation of the peep window provided in the chamber system is caused together with frictional rotation of a first flange, in which the peep window is provided, and a second flange, which surrounds the first flange and is surrounded by a stationary third flange. It is thus possible to greatly delay the limit of the period, during which observation of the object can be made, due to fogging of the peep window. Double wall sealing ring members are provided between the first and second flanges and between the second and third flanges of the chamber of the high temperature microscope. The space between the double wall sealings can be evacuated through an inverted T-shaped ventilation hole provided in the second flange. Thus, the chamber can be evacuated to a superhigh vacuum higher than the vacuum degree obtainable in the chamber of the prior art high temperature microscope.

9 Claims, 4 Drawing Figures

4,705,366

HIGH TEMPERATURE MICROSCOPE

This is a division of application Ser. No. 698,828, filed Feb. 6, 1985, U.S. Pat. No. 4,643,531, issued Feb. 17, 1987.

BACKGROUND OF THE INVENTION

1. Field of the Invention

This invention relates to a high temperature microscope and, more particularly, to a high temperature microscope including a peep window provided in a chamber.

2. Description of the Prior Art

There has been known a high temperature microscope comprising an optical system and a chamber system, in which an object to be observed is accommodated in a chamber having a peep window and capable of controlling at least either temperature, atmosphere and ambient pressure for observation of the object at a high temperature with the object and peep window positioned such that they cross the optical axis of the objective lens of the microscope. While this high temperature microscope is used to observe the object at a high temperature, vapor generated from the object is deposited on the inner or back surface of the peep window, which is thus fogged to become opaque in a short period of time. Therefore, it is no longer possible to continually observe the object. To avoid this, there has been proposed a high temperature microscope, in which there are provided a peep window capable of rotation about an axis parallel to and spaced apart from the optical axis of the objective lens and means for causing intermittent frictional rotation of the peep window to bring the opaque portion thereof out of the optical axis of the objective lens and bring a transparent portion to the position on the optical axis.

Also, there has been proposed another high temperature microscope, in which there is provided a thin transparent member disposed between a stationary peep window and an object to be observed for rotation about an axis extending parallel to and spaced apart from the optical axis of the objective lens such that vapor generated from the object is deposited on the transparent member to prevent vapor from being directly deposited on the peep window, the transparent member being intermittently frictionally rotated to bring the opaque portion of the transparent member resulting from vapor deposition out of the optical axis and bring a transparent portion to a position on the optical axis, thus permitting observation of the object through the peep window and transparent portion of the transparent member for a long time.

In the former one of the above two high temperature microscopes, the peep window is intermittently rotated about an axis extending parallel to and spaced apart from the optical axis to successively move a portion of the peep window which has become fogged and opaque due to vapor deposition during the observation of the object, thus permitting extending a time capable of observation to a certain extent. However, when the peep window is rotated by one rotation to that the initial portion of the peep window comes to the optical axis, this portion is opaque because the entire annular portion of the peep window is opaque. Therefore, no further observation of the object can be made.

When observing an object with a high temperature microscope, the ambient pressure in the chamber is controlled between a vacuum and a high pressure. Therefore, the diameter of the peep window can not be made very large from the standpoint of the pressure resistance. Also, the thickness of the peep window can not be made very large from the optical standpoint. That is, the peep window has to be as thin as possible and has as small diameter as possible. With a microscope having such a peep window, only several transparent portions at the most may be successively brought to a position on the optical axis for continuous observation by intermittently rotating the opaque portion of the peep window. This means that observation of an object of high vapor pressure or an object of low vapor pressure, i.e., pure iron, at a high temperature of 1,000° C. only for one minute.

In the latter high temperature microscope, in which the rotatable transparent member is provided between the peep window and the object, like the former high temperature microscope, an annular opaque portion of the transparent member is formed when the transparent member is rotated one rotation during observation. When this results, no further continual observation can be made, that is, the period, during which continuous observation can be made, is short like the former high temperature microscope. Further, with this high temperature microscope harmful reflected light is liable to be produced from the upper and lower surfaces of the transparent member during observation. Further, the transparent member must be made very thin. Therefore, it is difficult to make both the upper and lower surfaces of the transparent member smooth, and deterioration of the optical performance is prone. In order to solve the above-mentioned defects, the present inventors previously proposed a method of observing a metallic structure with a high temperature microscope to enable to observe the structure for an extended of time under a high vacuum and a high temperature by Japan Patent Laying Open Publication No. 59-31440/84 and read a paper on the subject at Proceedings of Fourth Japan Institute of Metals International Symposium held on Nov. 25–29, 1985.

SUMMARY OF THE INVENTION

An object of the present invention is to provide a high temperature microscope, which can eliminate and/or improve the drawbacks noted above inherent in the prior art high temperature microscope and permits observation of a high temperature object for a more extended period of time and under a higher vacuum than those performed in the method of Patent Laying Open Publication No. 59-31440/84.

According to the present invention, there is provided a high temperature microscope having a peep window provided in a chamber, which comprises:

a first flange provided in said chamber and surrounding the outer periphery of said peep window via a sealing ring member;

a second flange provided in said chamber and surrounding the outer periphery of said first flange via a sealing ring member; and a third flange secured to said chamber and surrounding the outer periphery of said second flange via a sealing ring member;

said second flange being rotatable about a stationary axis parallel to and spaced apart from the optical axis of an objective lens;

said first flange being rotatable about an axis parallel to and spaced apart from the axis of rotation of said second flange;

wherein when said peep window becomes opaque due to deposition thereon of vapor generated from an object at a high temperature in the chamber so that the observation of the object can no longer be made, at least either one of said first and second flanges is rotated by a predetermined angle to remove the opaque portion of the peep window from the field-of-view, thus permitting observation of the object for a long period of time.

DETAILED DESCRIPTION OF THE INVENTION

A high temperature microscope according to the present invention, like the prior art one, comprises an optical system and a chamber system. However, it has a unique feature in the mechanism, functions and effectiveness of a peep window provided in a chamber. In addition, it also features a chamber seal mechanism, which permits observation of an object at a high temperature while maintaining a superhigh vacuum degree which could not heretofore have been attained.

Before describing the high temperature microscope according to the present invention with reference to the drawings, the prior art high temperature microscope will be described with reference to FIG. 4.

Figure 4:
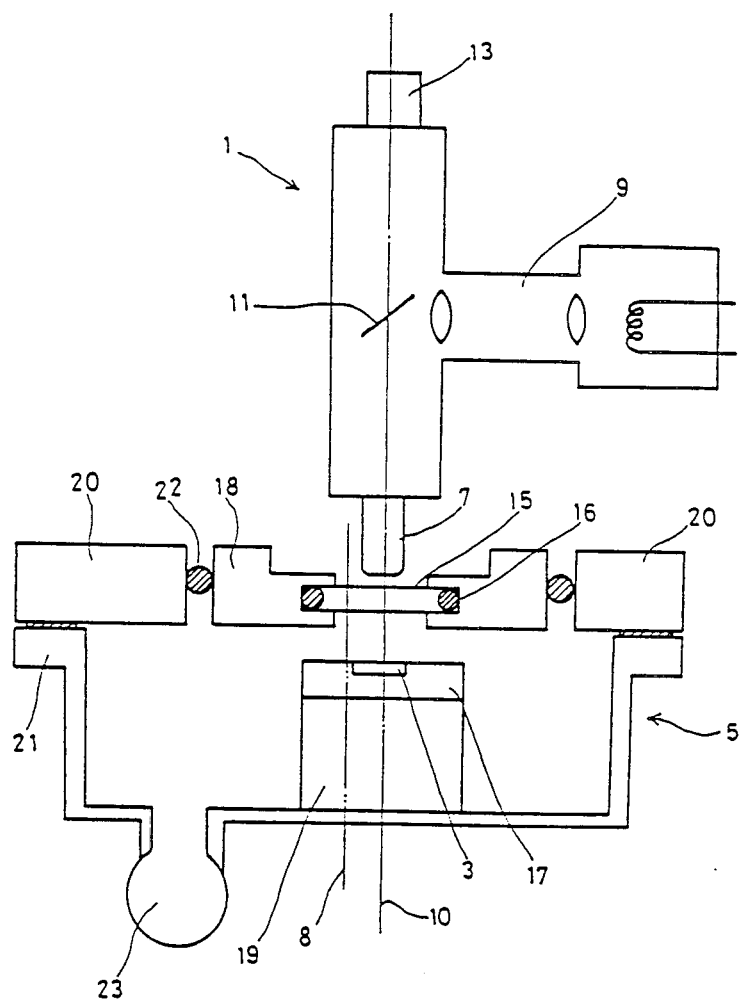
FIG. 4 is a longitudinal cross-sectional view showing a prior art high temperature microscope.

As shown in the longitudinal sectional view of FIG. 4, the prior art high temperature microscope has a peep window 15, which is rotatable about an axis 8 extending parallel to and spaced apart from an optical axis 10 of an objective lens 7.

The outer periphery of the peep window 15 is fixedly mounted in a flange 18 via a sealing ring member 16. The flange 18 is rotatably mounted in a flange 20 via a sealing ring member 22. The flange 20 is hermetically secured to a chamber 5. An object 3 to be observed can be placed on an object stage 17 disposed in the chamber 5 such that it crosses the optical axis 10. Heating means 19 is provided in the neighborhood of the object stage 17, and the object 3 at a high temperature can be observed through the peep window 15 and the objective lens 7.

While the object 3 is observed under a high temperature condition, vapor is generated from the object 3 depending on its kind and is deposited on a portion of the back surface of the peep window 15 which is closest to the object 3. With the deposition of vapor that portion eventually becomes opaque so that the observation becomes impossible. When this occurs, the flange 18 is slightly rotated to bring a transparent portion of the peep window to a position on the optical axis 10 connecting the objective lens 7 and the object 3. In this way the flange 18 is rotated stepwise at a small interval every time wherein the closest peep window portion becomes opaque. Observation thus can be continued until the flange 18 completes one rotation. With the prior art high temperature microscope, however, it is only several times that the flange 18 can be rotated for observing the high temperature object, and no further observation can be continued.

The amount of vapor that is generated from the object depends on and is increased with the kind of object and observation temperature, and a transparent portion of the peep window 15 brought to a position on the optical axis 10 by turning the peep window 15 by a certain angle becomes opaque in several minutes. Therefore, the time until the peep window 15 is rotated by one rotation is inevitably reduced. Therefore, the observation of the object 3 can not be made for a required period of time.

Figure 1:
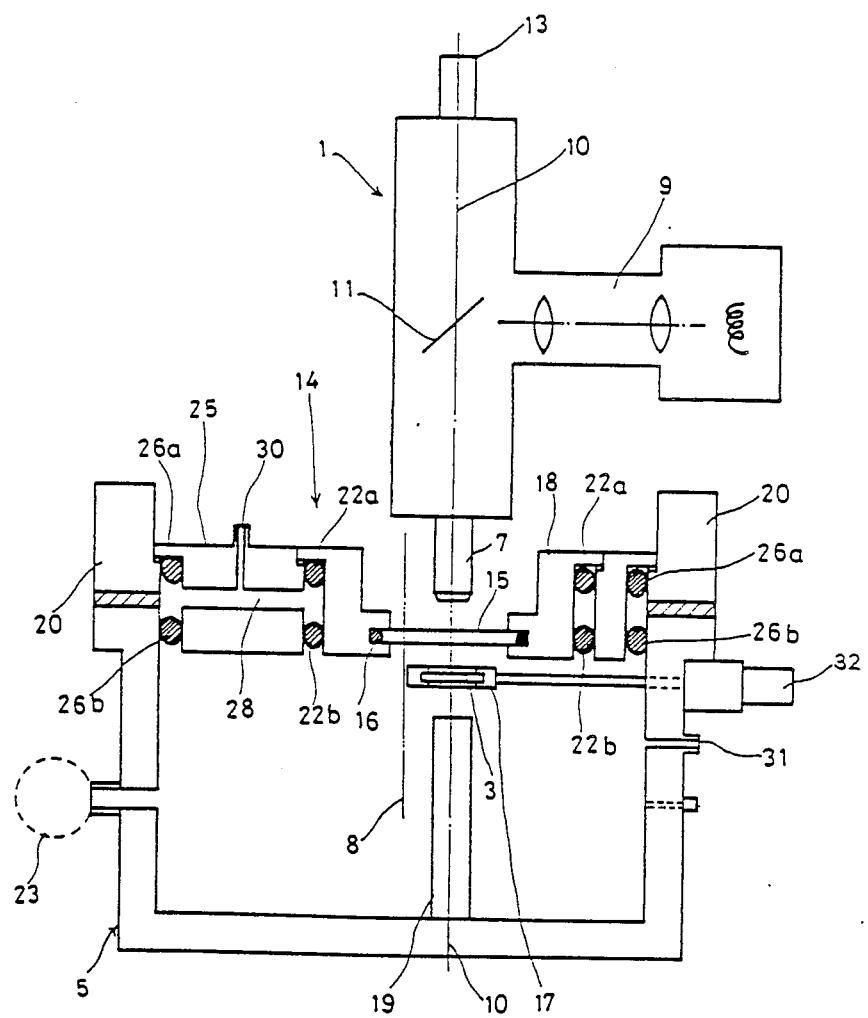
FIG. 1 is a longitudinal cross-sectional view showing an embodiment of high temperature microscope according to the present invention.

One embodiment of the high temperature microscope according to the present invention will now be described with reference to the longitudinal cross-sectional view of FIG. 1.

The high temperature microscope according to the present invention comprises the optical system and the chamber system as noted above. The optical system 1 includes an objective lens 7, an ocular 13, a half mirror 11 and a vertical illumination 9. The constitution and means of the optical system may be those of the optical system of the prior art high temperature microscope.

In the chamber system 5 of the high temperature microscope according to the present invention, the heating means 19 such as electron gun for heating the object 3 and the object stage 17 supporting the object 3, a vacuum pump 23 for evacuating the chamber accommodating the object 3, atmosphere conversion means (not shown) or the like may be the same as those used in the prior art.

In the microscope according to the present invention, a novel construction is adopted in means 14 for causing frictional rotation (hereinafter referred to as rotation) of the peep window 15 in the chamber system 5. More specifically, the peep window 15 can not only be rotated in unison with the first flange 18, but the peep window 15 and the first flange 18 can be rotated in unison with a second flange 25.

In the microscope according to the present invention, vertically spaced-apart sealing ring members 22a and 22b are provided between the inner periphery of the second flange 25 and the outer periphery of the first flange 18. Also, vertically spaced-apart sealing ring members 26a and 26b are provided between the outer periphery of the second flange 25 and a stationary third flange 20. Therefore, it is possible to maintain high gas tightness when evacuating the chamber 5 to a superhigh vacuum degree.

A ventilation hole 28 is provided between the inner and outer peripheries of the second flange 25. An upright communication hole 30 is provided such that it communicates with an extend from an intermediate portion of the ventilation hole 28 in an inverted T-shaped form. The opening of the communication hole 30 on the upper surface of the second flange can be communicated with a vacuum pump as exhausting means (not shown). The openings of the ventilation hole 28 at the inner and outer peripheries of the second flange 25 are found between the sealing ring members 22a and 22b and sealing ring members 26a and 26b. With the above construction of the ventilation hole 28 and the communication hole 30, it is possible to maintain a high vacuum degree, if necessary, using means for exhausting the space noted above. Thus, it is possible to perfectly prevent the reduction of the gas tightness when rotating the first and/or second flange 18 and/or 25.

However, when the high temperature microscope according to the present invention is used in case when there is no need of observing the object 3 under a high vacuum degree, there is no need of providing the double wall structure sealing ring members 22a and 22b and sealing ring members 26a and 26b and providing the ventilation hole 28 and the communication hole 30. That is, it is possible to omit the ventilation hole and the communication hole in the second flange and provide a single wall structure of sealing ring members.

The high temperature microscope chamber 5, like the high temperature microscope chamber in the prior art, is provided with the vacuum pump 23, object heating means 19 such as an electron gun, and atmospheric gas introduction means 31. The atmospheric gas introduction means 31 is provided with a connector (not shown), which readily permits connection of a gas bomb filled with a desired gas such as argon gas or nitrogen gas.

Although not shown, a cooling unit made of copper is disposed in the chamber 5. Liquid nitrogen or the like is supplied into the cooling unit for cooling. Resultant moisture in the chamber 5 is attached to the surface of the cooling unit. The attached moisture oxidizes the impurity gas in the chamber 5, so that it is possible to obtain a high vacuum degree.

The object 3 is supported on the object stage 17, and the object can be readily replaced with an object take-out mechanism 32 provided in the chamber 5. With the provision of the pump and means, the behavior of the object can be observed under various conditions of controlled vacuum degree, controlled temperature and-/or various kinds of gas atmospheres.

A mechanism will now be described, with which the peep window 15 provided in the chamber 5 is suited for long-period observation of an object with the high temperature microscope according to the present invention.

The optical system, i.e., microscope body 1, may be the same as that of the prior art high temperature microscope, and is provided with the objective lens 7, ocular 13, vertical illumination 9 and half mirror 11. Further, there are provided the object stage 17 for supporting the object 3 and the heating means 19, the object stage 17 and the heating means 19 being disposed in the chamber 5 for accommodating the object 3. The object 3 is disposed right underneath the peep window 15 such that it crosses the optical axis of the objective lens 7.

While the object 3 is observed at a high temperature with the microscope 1, vapor generated from the object 3 is deposited on a portion of the back surface of the peep window 15 which is closest to the object 3. This portion eventually becomes opaque, and in this state no further observation is possible. When such circumferences occur, the first flange may be rotated slightly. As a result, the opaque portion of the peep window gets out of the optical axis, and a transparent portion of the peep window appears on the optical axis. Now, it is possible to observe the object through the transparent portion.

Figure 2:
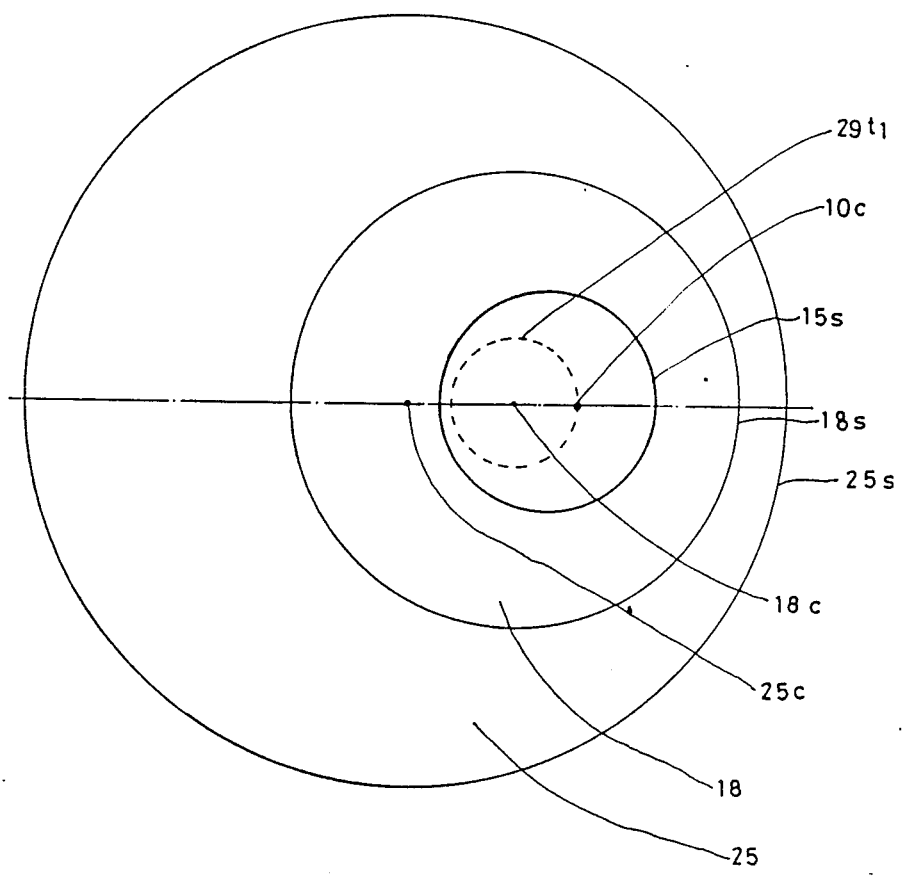
FIGS. 2 and 3 are views showing an orbit of opaque portion of the back surface of a peep window formed with the rotation of first and/or second flange of the high temperature microscope according to the present invention.

FIG. 2 is a plan view illustrating a geometrical positional relation between the first and second flanges 18 and 25 for explaining the fact that a transparent portion of the peep window can be brought to a position on the optical axis 10 with movement of the opaque portion of the peep window caused by rotating the first and/or second flange 18 and/or 25 for continuously observing the object with the high temperature microscope according to the present invention. For the sake of simplicity of description, it is assumed that an optical axis $10c$, an axis $18c$ of the first flange and an axis $25c$ of the second flange are all on a straight line.

With reference to FIG. 2, while an object (not shown) in the chamber and at a position on the optical axis $10c$ is observed through the peep window (not shown), vapor from the object is deposited to the back surface of the peep window, so that the peep window becomes opaque. At this time, the first flange 18 is rotated slightly about its axis $18c$ to bring the opaque portion out of the optical axis $10c$ and bring a transparent portion to a position on the optical axis $10c$. Now, the continual observation of the object is made. After the lapse of a certain period, the peep window again becomes opaque. At this time, the first flange 18 is further rotated to bring a now transparent portion to the position on the optical axis $10c$. The orbit of opaque portion of the peep window when the first flange 18 is rotated by one rotation, i.e., field-of-view orbit, is labeled $29t1$. The orbit $29t1$ of course is found in a circle of outer periphery $15s$ of the peep window. This is so because if the orbit gets out of the circle, the object gets out of the field-of-view so that it can no longer be observed.

Figure 3:
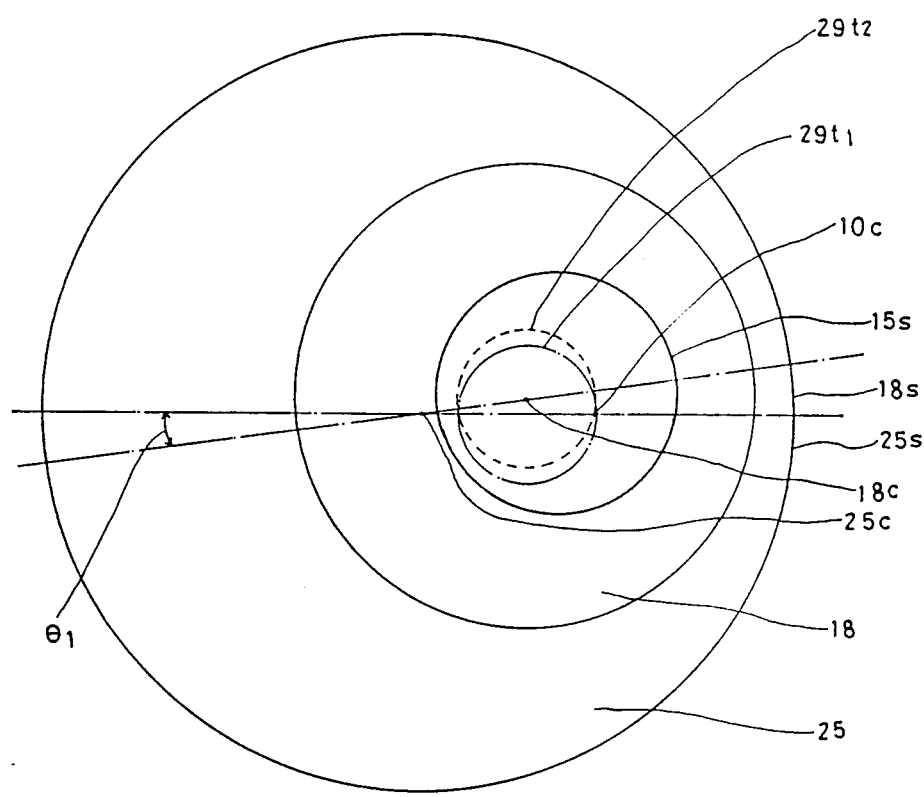

With the high temperature microscope in the prior art, the field-of-view orbit $29t1$ is rotated by one rotation on the peep window about the axis $18c$ of the first flange, and subsequently there is no means for bringing other transparent portion of the peep window to a position on the optical axis. With the microscope according to the present invention, when the field-of-view orbit $29t1$ as shown in FIG. 2 is rotated by one rotation, the second flange 25 is slightly rotated about the axis $25c$ of the second flange without changing the relative position between the first and second flanges. As a result, the field-of-view orbit $29t1$, a peep window outer periphery line $15s$, a first flange outer periphery line $18s$ and the first flange axis $18c$ shown in FIG. 2 are brought to respective relative positions as shown in FIG. 3. In the Figure, labeled $\theta_1$ is an angle, by which the second flange 25 is rotated about the axis $25c$ of the second flange.

When the relative positions shown in FIG. 3 are obtained, the line connecting the object facing the optical axis 10 and the optical axis $10c$, i.e., a peep window portion where the optical axis 10 (see FIG. 1) crosses the peep window 15, becomes transparent, so that observation of the object can be continually made for a while. Eventually, however, the portion in the field-of-view becomes opaque due to deposition of vapor. At this time, the first flange is rotated about the axis $18c$ while holding the second flange stationary. This is done every time an opaque portion results. As a result, the opaque portion of the peep window is rotated along an orbit labeled $29t2$.

When the circular orbit $29t2$ of the opaque portion is formed, no transparent portion will appear on the optical axis $10c$ by subsequently rotating the first flange about its axis $18c$. When this situation occurs, the second flange is rotated by a certain angle about its axis $25c$. Then, the first flange is rotated about the axis $18c$ with the second flange held stationary. This is done every time an opaque portion is produced. Thus, a transparent portion appears on the axis $10c$, making it possible to make continual observation of the object.

The diameter of the opaque portion that appears on the back surface of the peep window 15 (see FIG. 1) is usually approximately 2 mm. Therefore, with a peep window having a diameter of 60 mm, for instance, the first and second flanges can be rotated intermittently at a small interval for about 200 rotations until the entire surface of the peep window becomes opaque. That is, it is possible continue observation of the object 200 rotations. If the period available for one rotation until the transparent portion becomes opaque is one minute, the observation can be continued for 200 minutes. With the prior art microscope, the observation can no longer be continued after 20 rotations at the most. This means that the microscope according to the present invention permits continuous observation for a long time corresponding to about 10 times the period available with the prior art high temperature microscope.

Now, examples of the present invention will be described.

EXAMPLE 1

A quartz glass peep window was provided in a SUS 304 chamber system. The diameter and thickness of the peep window were 60 mm$\phi$ and 3 mm, respectively. The outer diameter of the first flange was 90 mm$\phi$. The outer diameter of the second flange was 130 mm$\phi$. The outer diameter of the stationary third flange was 200 mm$\phi$. The distance between the optical axis and the axis of the second flange could be controlled in a range of 10 to 30 mm. Thrust bearings (not shown) were provided between the first and second flanges 18 and 25 and also between the second and third flanges 25 and 20 so that the flanges could be smoothly rotated relative to one another.

The vacuum pump 23 provided in the chamber system was a combination of a turbo molecular pump and a rotary pump. The chamber 5 may be preliminarily heated to 120° C., for instance, and it was evacuated to a vacuum degree of $5 \times 10^{-9}$ Torr.

As the sealing ring members to which O-ring, X-ring and magnetic fluid sealing ring belong, O-rings called "Viton" (a trade name) were used. The gap between the sealing ring members 22a and 22b and between the sealing ring members 26a and 26b was set to approximately 10 mm. The space between the sealing ring members noted above was exhausted through the ventilation hole 30 using a vacuum pump which was capable of providing a vacuum degree of $10^{-4}$ to $10^{-5}$ Torr. The distance between the surface of the object 3 and the objective lens 7 was set to approximately 11.0 mm. As the object heating means, an electron gun with ratings of 2 kV and 30 mA was used, and a pure iron as the object was heated with 1 kW, 12 mA to 900 to 1,000° C. The thickness and diameter of the object were 0.2 mm and 8 mm, respectively. The vacuum degree at this time was $3 \times 10^{-7}$ Torr.

As the optical system, a high temperature microscope manufactured by Olympus Optical Co., Ltd. was used. The objective lens was MS Plan$\times$20, with operation distance of 11.0 mm, aperture number of 0.46 and resolution of 0.7 $\mu$m. Further, Ocular$\times$10, a Nomarski type differential interference prism and a mercury lamp light source were used. Since the object heated to a high temperature gleams and is glaring, the normal to the plane of the peep window was tilted by an angle of 1° to 5° from the vertical.

When the pure iron was observed under the conditions noted above, vapor of Fe and other elements was deposited on the back surface of the peep window, so that the peep window became opaque. Approximately 3 minutes were available until completion of one rotation. With the intermittent rotation of the first and/or second flange caused every time the peep window became opaque, it was possible to observe the object continuously for 600 minutes.

When observation was continued without rotation of the second flange as contrast, the observation could be made only for a continuous period of approximately 60 minutes. This period was insufficient for the observation of the object.

EXAMPLE 2

Observation was performed under the same conditions as in Example 1 except for that the observation temperature of the object was set to 1,300° C. In this case, the time available for observation until one rotation was approximately one minute. However, with the rotation of the first and/or second flange it was possible to continue observation for approximately 200 minutes.

It is preferable to provide a heat-resistant glass piece supported with the third flange having a circular opening, the diameter of the through-hole being, for example, 2 mm, and the through-hole and the optical axis intersecting in the center of the opening, between the peep window and the object stage of the chamber system of the high temperature microscope according to the present invention, because the diameter of the opaque portion of the peep window formed due to deposition of vapor can be limited.

As has been described in the foregoing, with the high temperature microscope according to the present invention it is possible to make observation continuously for as long period as about ten times the period heretofore available for continuous observation. In addition, according to the present invention the peep window of the chamber system is rotated the first and/or second flange. Therefore, despite the fact that there is high opportunity of reduction of the vacuum degree of the chamber with the rotation, the chamber can be evacuated to a superhigh vacuum degree, which is far high compared to the vacuum heretofore obtained, with the double wall sealing ring member structure provided between the first and second flanges and between the second and third flanges and exhausting means consisting of the inverted T-shaped communication hole and the ventilation hole provided in the second flange. It is thus possible to make microscopic analysis of such status as phase transition of an object at a high temperature and crystal grain growth. Using the present invention various findings could be obtained concerning high temperature transition phenomena of substances, which could have been impossible to obtain with the prior art means. Thus, the present invention is industrially extremely valuable.

What is claimed is:

1. A high temperature microscope having a peep window provided in a chamber, comprising:
    a first flange provided in said chamber and surrounding the outer periphery of said peep window via a sealing ring member;
    a second flange provided in said chamber and surrounding the outer periphery of said first flange via a sealing ring member; and
    a third flange secured to said chamber and surrounding the outer periphery of said second flange via a sealing ring member;

said second flange being rotatable about a stationary axis parallel to and spaced apart from the optical axis of an objective lens;

said first flange being rotatable about an axis parallel to and spaced apart from the axis of rotation of said second flange;

wherein when said peep window becomes opaque due to deposition thereon of vapor generated from an object at a high temperature in the chamber so that the observation of the object can no longer be made, at least either one of said first and second flanges is rotated by a predetermined angle to remove the opaque portion of the peep window from the field-of-view, thus permitting observation of the object for a long period of time.

2. The high temperature microscope according to claim 1, wherein said second flange surrounds said first flange via vertically spaced-apart sealing ring members on the inner periphery of said second flange.

3. The high temperature microscope according to claim 1, wherein said third flange surrounds said second flange via vertically spaced-apart sealing ring members on the outer periphery of said second flange.

4. The high temperature microscope according to claim 3, wherein:

said second flange is provided with a ventilation hole communicating the inner and outer peripheries of said second flange;

a communication hole is provided such that it communicates with said ventilation hole and extends from an intermediate portion thereof in an inverted T-shaped fashion;

the open ends of said communication hole at the inner and outer peripheries of said second flange are found between the vertically spaced-apart sealing ring members provided on the inner and outer peripheries of said second flange; and the open end of said communication hole provided on top of said second flange is communicated with exhausting means;

the gas tightness of the chamber being thus improved on the inner and outer peripheries of said second flange.

5. The high temperature microscope according to claim 4, wherein an object stage is provided in said chamber, and the object on said object stage is provided such that it crosses the optical axis of said objective lens together with said peep window.

6. The high temperature microscope according to claim 5, wherein said chamber accommodates heating means for adjustably heating the object supported on said object stage to a high temperature.

7. The high temperature microscope according to claim 6, wherein said chamber accommodates means for converting atmosphere gas in said chamber.

8. The high temperature microscope according to claim 7, wherein said chamber accommodates evacuation/pressure application means for controlling the pressure in said chamber between a high vacuum degree and a high pressure.

9. The high temperature microscope according to claim 2, wherein said third flange surrounds said second flange via vertically spaced-apart sealing ring members on the outer periphery of said second flange.

* * * * *

UNITED STATES PATENT AND TRADEMARK OFFICE
CERTIFICATE OF CORRECTION

PATENT NO. : 4,705,366
DATED : November 10, 1987
INVENTOR(S) : Hiroshi Kimura and Kenji Abiko It is certified that error appears in the above-identified patent and that said Letters Patent are hereby corrected as shown below:

Title page, item [62]

Delete "Related U.S. Application Data

Division of Ser. No. 698,828, Feb. 6, 1985,

Pat. No. 4,643,531".

Signed and Sealed this

First Day of November, 1988

Attest:

DONALD J. QUIGG

*Attesting Officer*  *Commissioner of Patents and Trademarks*